(12) United States Patent
Janioud et al.

(10) Patent No.: US 11,692,824 B2
(45) Date of Patent: Jul. 4, 2023

(54) VIBRATION-RESISTANT GYROMETER

(71) Applicant: COMMISSARIAT A L'ENERGIE ATOMIQUE ET AUX ENERGIES ALTERNATIVES, Paris (FR)

(72) Inventors: Pierre Janioud, Grenoble (FR); Guillaume Jourdan, Grenoble (FR); Alexandra Koumela, Grenoble (FR); Christophe Poulain, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/455,778

(22) Filed: Nov. 19, 2021

(65) Prior Publication Data
US 2022/0163329 A1 May 26, 2022

(30) Foreign Application Priority Data
Nov. 20, 2020 (FR) .................................... 20 11962

(51) Int. Cl.
*G01C 19/5705* (2012.01)
*G01C 19/5776* (2012.01)

(52) U.S. Cl.
CPC ..... *G01C 19/5705* (2013.01); *G01C 19/5776* (2013.01)

(58) Field of Classification Search
CPC combination set(s) only.
See application file for complete search history.

(56) References Cited

U.S. PATENT DOCUMENTS 8,322,213 B2 * 12/2012 Trusov ............... G01C 19/5747
73/504.12
9,651,375 B2 * 5/2017 Kuhlmann ......... G01C 19/5747
(Continued)

FOREIGN PATENT DOCUMENTS

EP 2 211 143 A1 7/2010
EP 2 430 397 A1 3/2012
(Continued)

OTHER PUBLICATIONS

Mohammad Faisal Zaman, et al., "A Mode-Matched Silicon-Yaw Tuning-Fork Gyroscope With Subdegree-Per-Hour Allan Deviation Bias Instability," Journal of Microelectromechanical Systems, vol. 17, No. 6, Dec. 2008, pp. 1526-1536.
(Continued)

*Primary Examiner* — Paul M. West
*Assistant Examiner* — Mark A Shabman
(74) *Attorney, Agent, or Firm* — Oblon, McClelland, Maier & Neustadt, L.L.P.

(57) ABSTRACT

A gyrometer including a first dual-mass gyrometer including a planar substrate, first left and right inertial masses including a first left and right frames, respectively, aligned along a first excitation axis $X_1$ parallel to an excitation direction, and mounted with the ability to slide on the substrate along the first excitation axis $X_1$, and first left and right central masses, respectively, mounted with the ability to slide in the first left and right frames, respectively, parallel to a first detection direction perpendicular to the excitation direction; a first coupling spring interposed between the first left and right frames; a first rocker mounted with the ability to rotate on the substrate about a first rocker pivot, first left and right ends of the first rocker being connected to the first left and right central masses, respectively; second left and right inertial masses aligned along a second axis $X_2$ parallel to the
(Continued)

excitation direction, and mounted with the ability to slide on the substrate along the second axis $X_2$.

19 Claims, 9 Drawing Sheets

(56) References Cited

U.S. PATENT DOCUMENTS

| | | | |
|---|---|---|---|
| 10,948,294 B2* | 3/2021 | Gregory | G01C 19/5747 |
| 2012/0061172 A1 | 3/2012 | Yacine | |
| 2012/0125099 A1 | 5/2012 | Scheben et al. | |
| 2015/0330783 A1* | 11/2015 | Rocchi | G01C 19/5769 |
| | | | 73/504.12 |
| 2015/0377623 A1* | 12/2015 | Waters | G01C 19/5705 |
| | | | 73/504.12 |
| 2018/0172445 A1* | 6/2018 | Prikhodko | G01C 19/574 |
| 2018/0172447 A1* | 6/2018 | Prikhodko | G01C 19/5747 |

FOREIGN PATENT DOCUMENTS

| | | |
|---|---|---|
| EP | 2 520 940 A1 | 11/2012 |
| EP | 2 600 104 A2 | 6/2013 |
| WO | WO 2010/130765 A1 | 11/2010 |

OTHER PUBLICATIONS

Alexandra Koumela, et al., "Resilience to vibration of a tuning fork MEMS gyroscope," Procedia Engineering, 30th Eurosensors Conference, EUROSENSORS 2016, vol. 168, 2016, pp. 1725-1730.

Pierre Janioud, et al., "Tuning the Anti-Phase Mode Sensitivity to Vibrations of a MEMS Gyroscope," Proceedings, vol. 1, 2017, 4 pages.

Jan-Timo Liewald, et al., "100 kHz MEMS Vibratory Gyroscope," Journal of Microelectromechanical Systems, vol. 22, No. 5, Oct. 2013, pp. 1115-1125.

French Preliminary Search Report dated Jul. 27, 2021 in French Application 20 11962 filed on Nov. 20, 2020, 3 pages (with English Translation of Categories of Cited Documents).

* cited by examiner

[Fig 1]
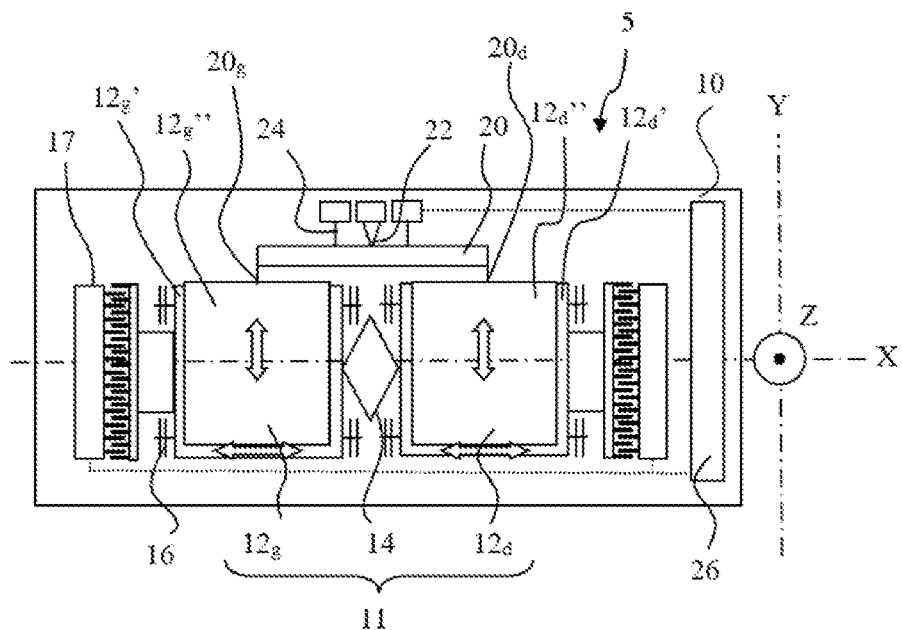
[Fig 2]
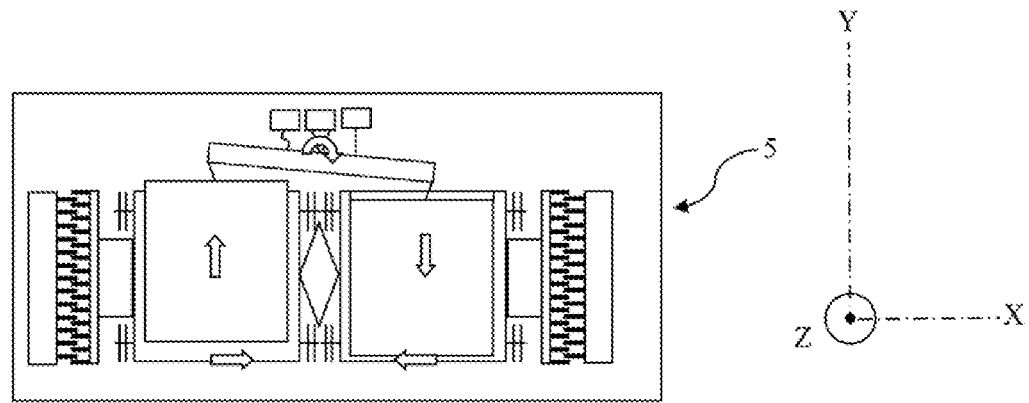

[Fig 3]
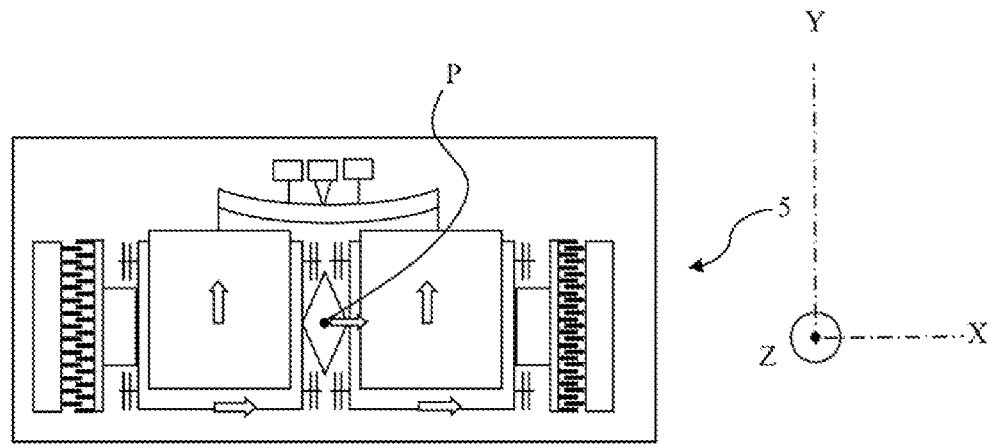
[Fig 4]
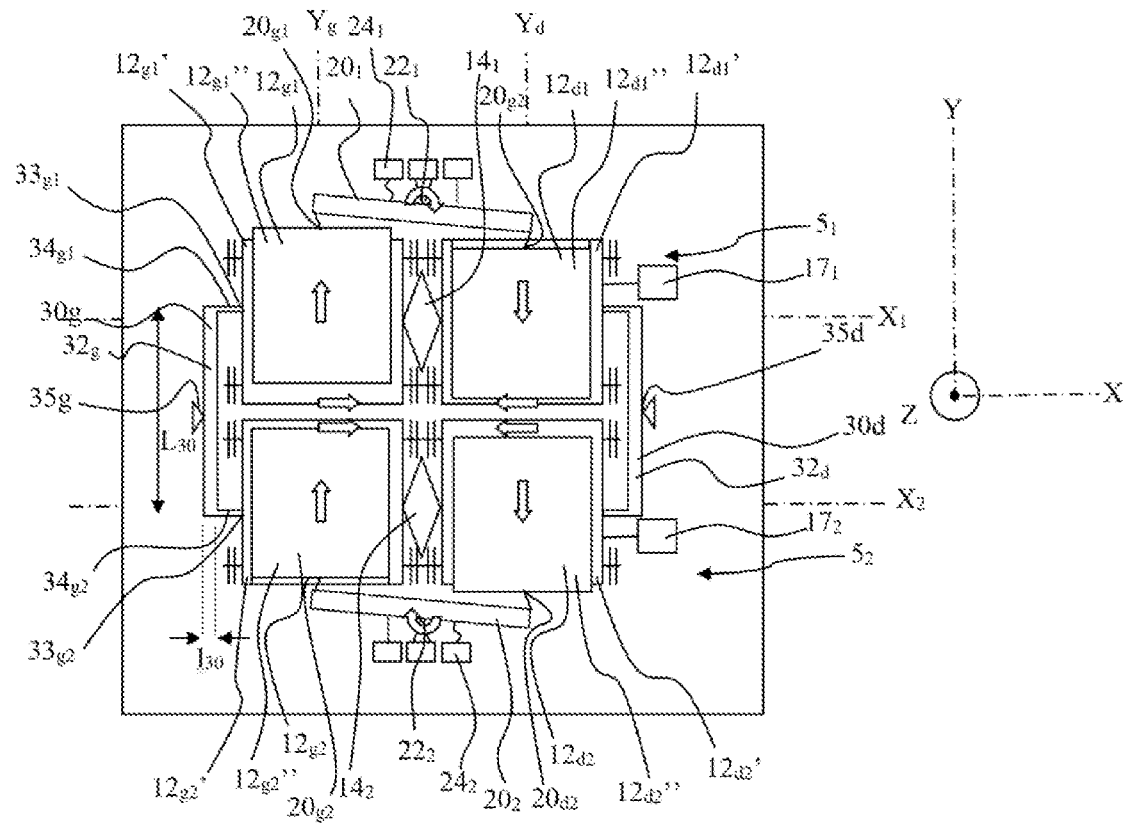

[Fig 5]
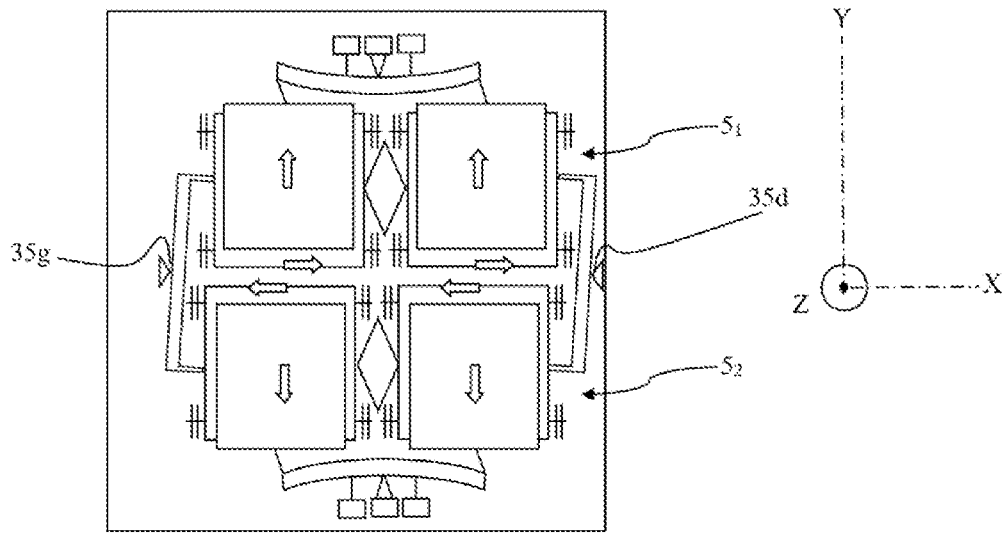
[Fig 6]
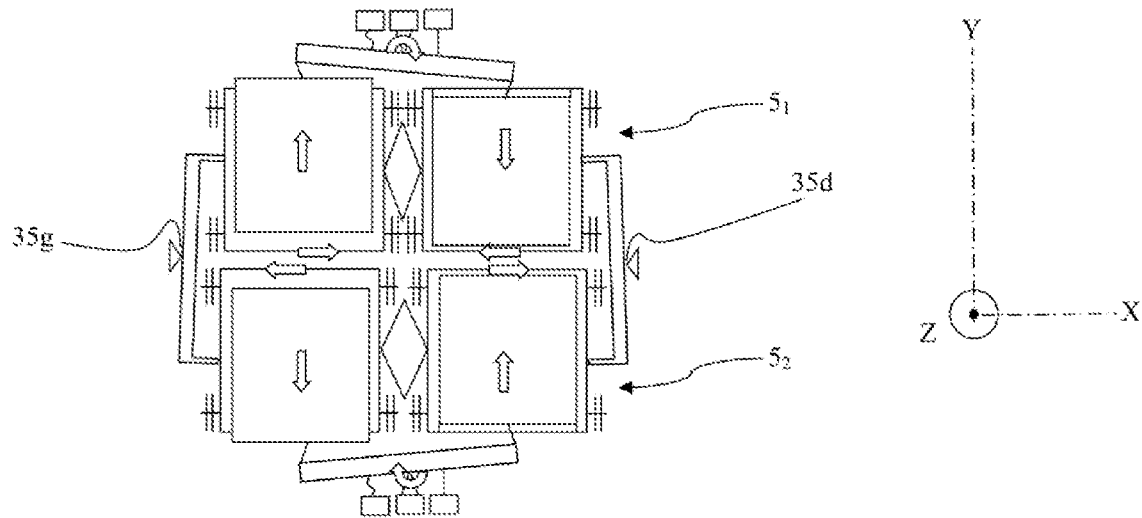

[Fig 7]
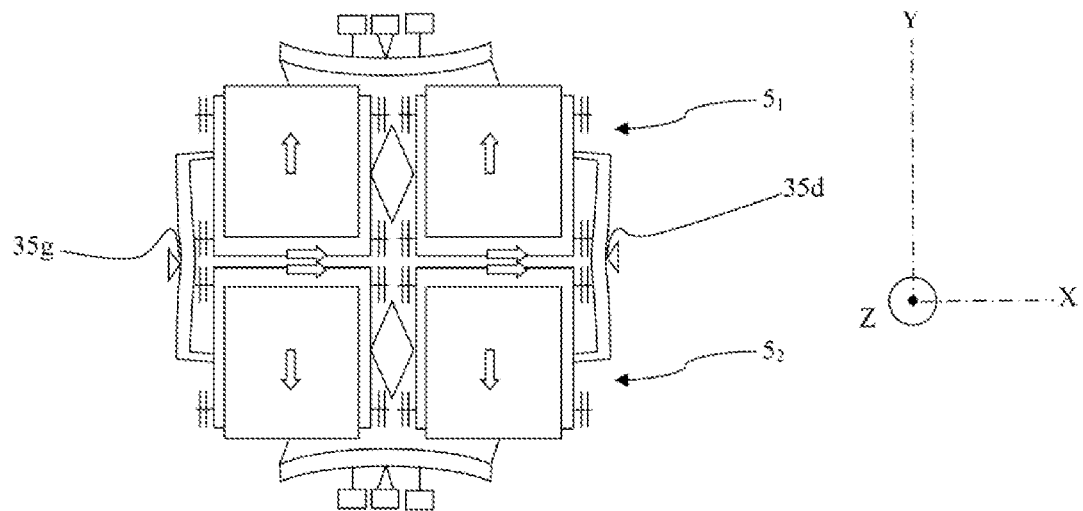
[Fig 8]
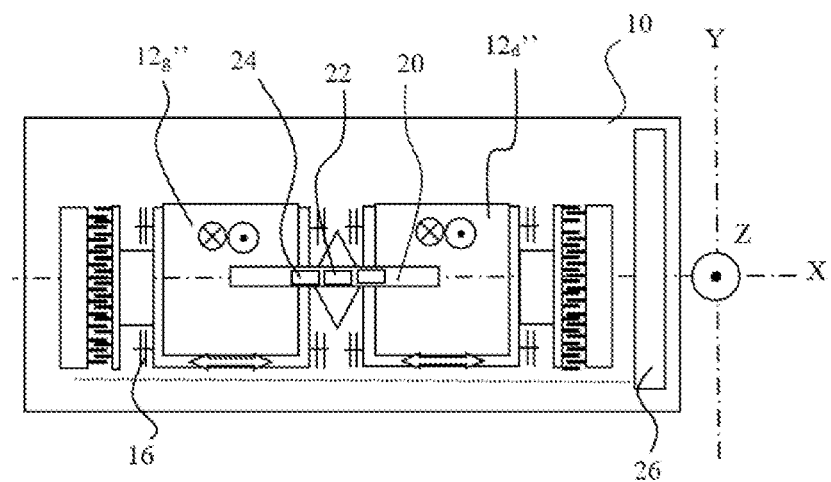

[Fig 9]
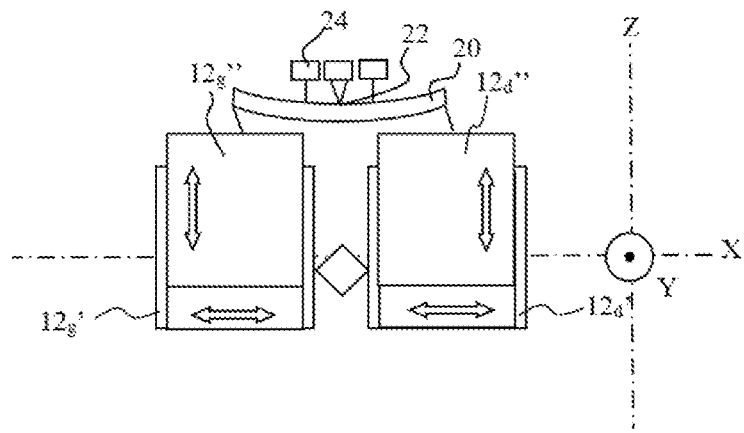
[Fig 10]
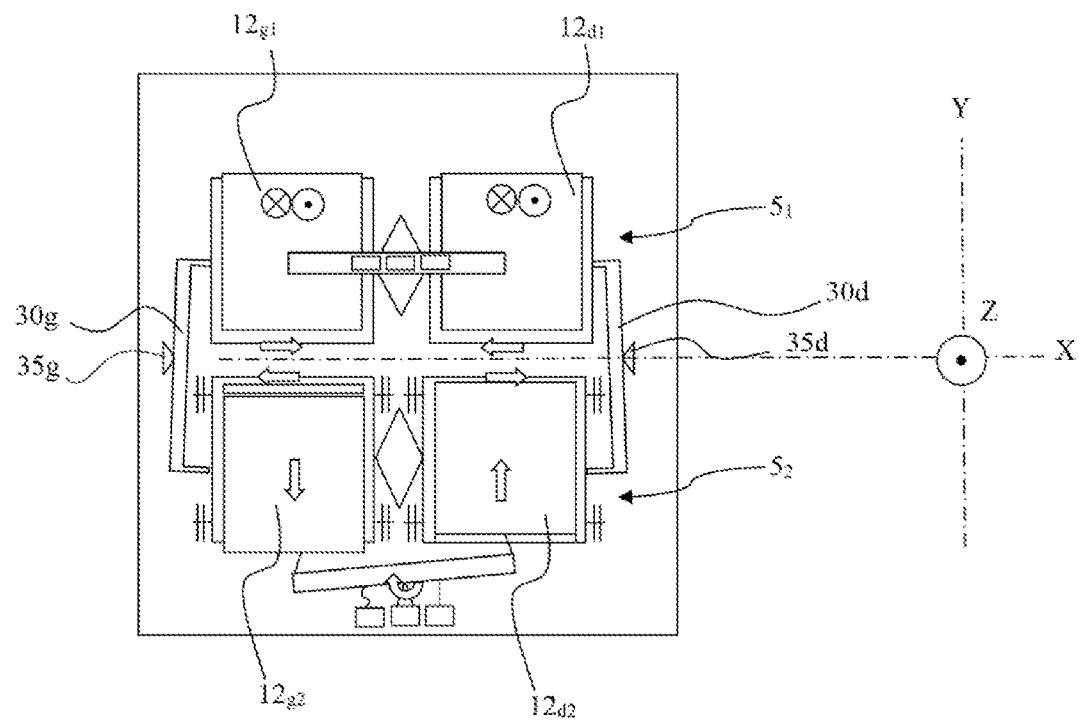

[Fig 11]
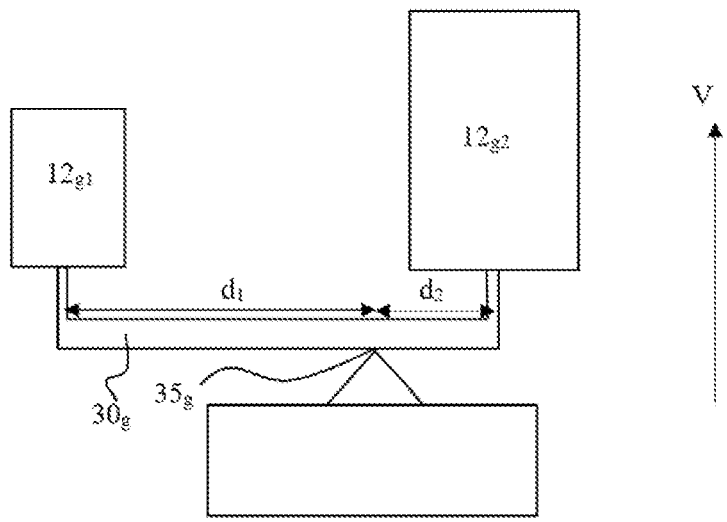
[Fig 12]
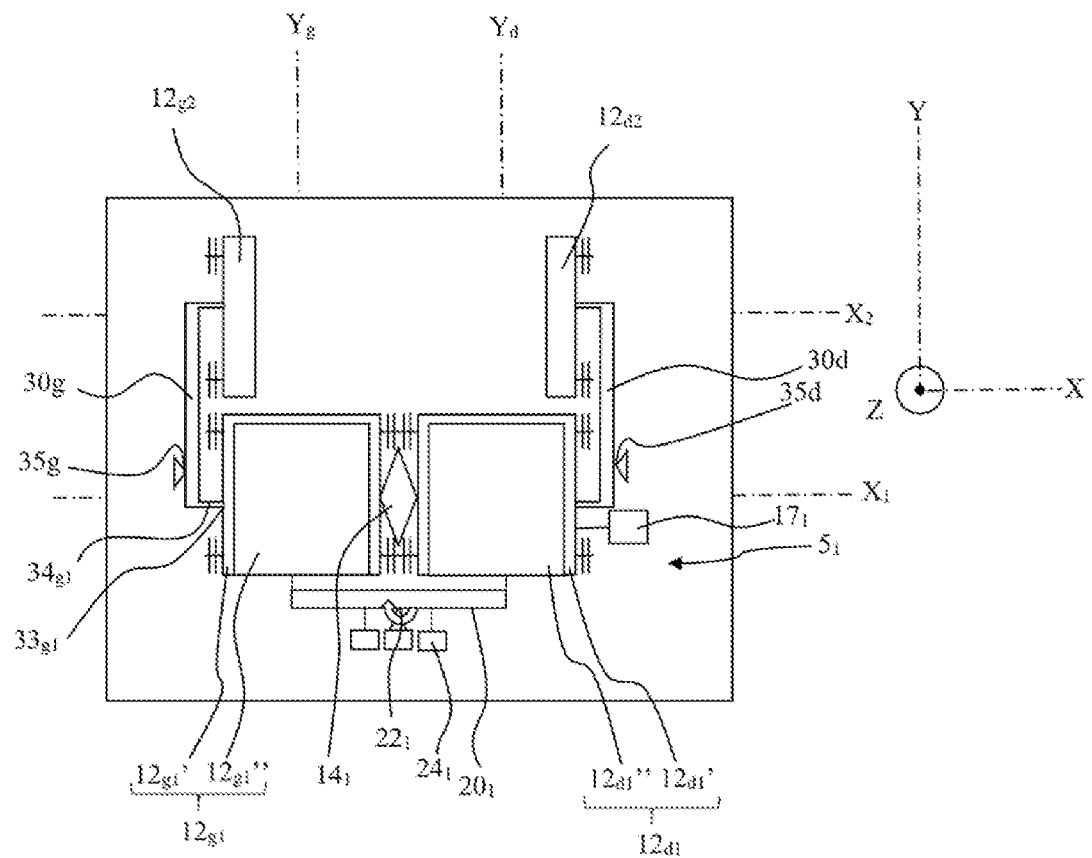

[Fig 13]
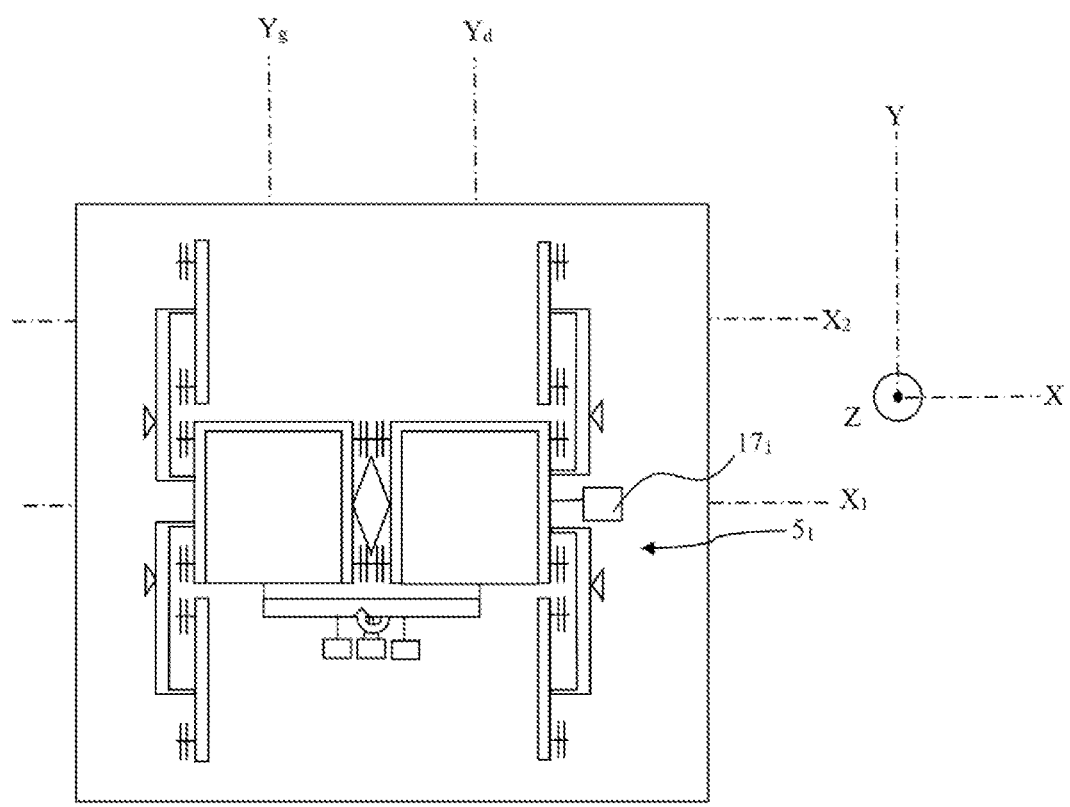

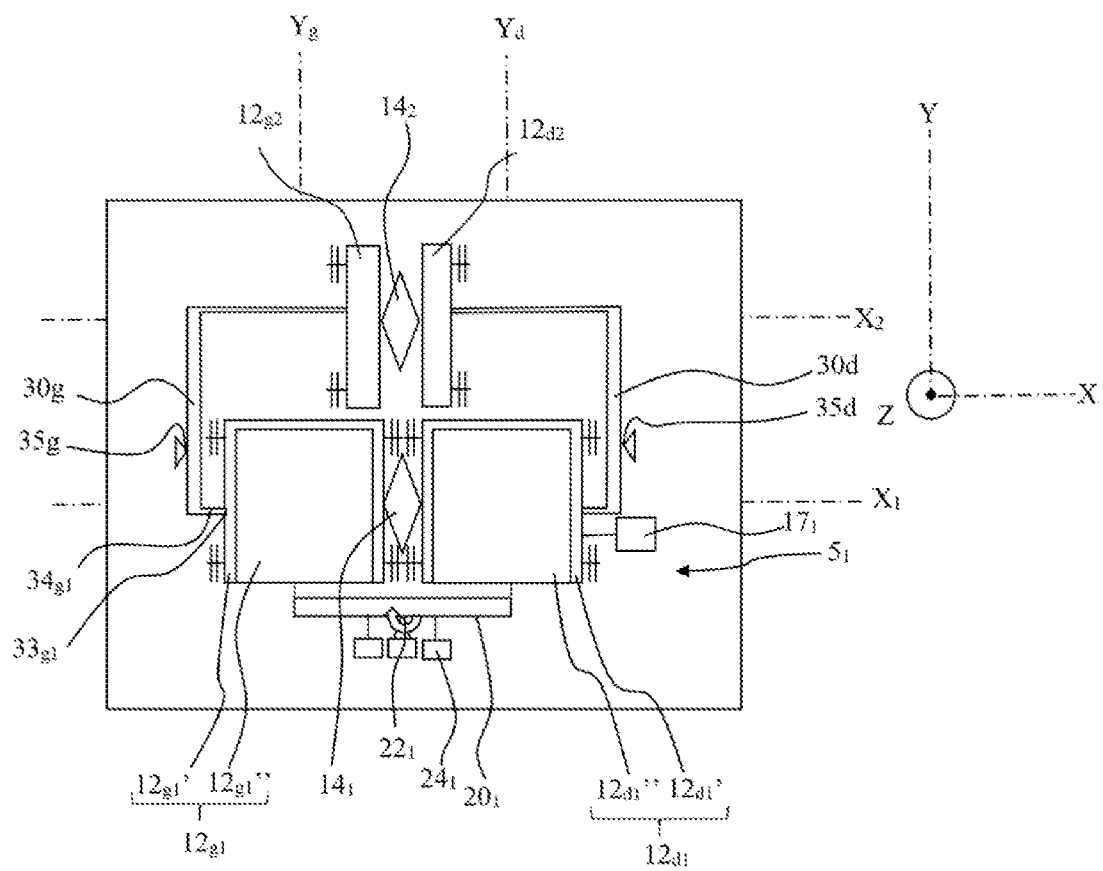
[Fig 14]

[Fig 15]
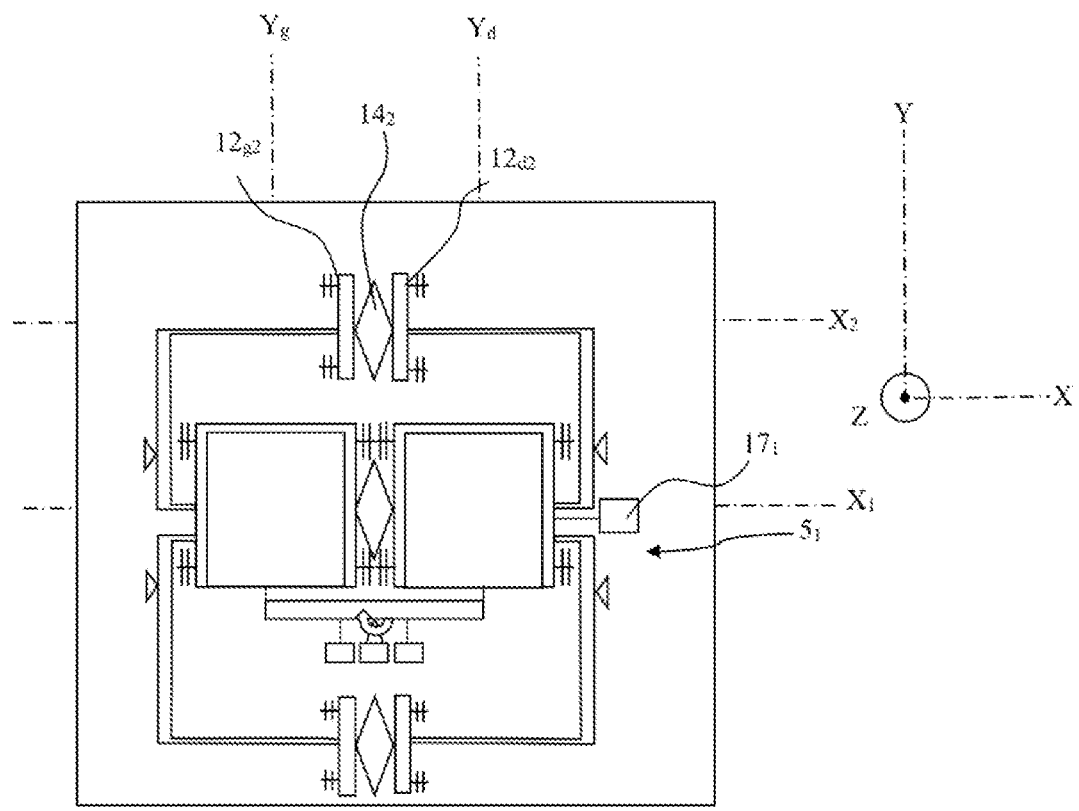

VIBRATION-RESISTANT GYROMETER

TECHNICAL FIELD

The present invention relates to a gyrometer in the form of a microelectromechanical system (MEMS) or of a nano-electromechanical system (NEMS). In the remainder of the description, the term "gyrometer" refers to such a MEMS or NEMS gyrometer.

PRIOR ART

A distinction is generally made between gyroscopes, which are used to measure the amplitude of a rotation (or an angular position), and gyrometers, which are used to measure a speed of rotation. Although gyrometers, like gyroscopes, make use of the Coriolis force, the problems that arise in these two applications, and the solutions for solving them, generally differ.

Gyroscopes require extremely high resonator response times in order to be able to operate unconstrained, without external excitation, for a duration typically in excess of 30 s, which means an imposed level of performance and of precision. Furthermore, a gyroscope has to have axes of movement that are finely tuned with respect to one another for the excitation mode. In particular, the inertial masses of a gyroscope are subject to stiffnesses $k_x$ and $k_y$, along the two perpendicular axes x and y of the plane, that need to be rigorously identical.

MEMS gyrometers constitute simpler mechanical systems which require just one excitation direction for the excitation mode.

EP 2 600 104 discloses an example of a dual-mass gyrometer.

As indicated schematically in FIG. 1, a dual-mass gyrometer 5 is a planar structure, the thickness of which is typically comprised between 10 and 150 μm. It conventionally comprises:
a substrate 10, and
an inertial mass 11 capable of moving with respect to the substrate.

The inertial mass 11 itself comprises "left" and "right" inertial masses referenced $12_g$ and $12_d$ respectively, preferably identical, aligned parallel to an excitation direction X or "drive axis".

Each inertial mass $12_g$ and $12_d$ comprises a frame, referenced $12_g'$ and $12_d'$, respectively, which slides, on the substrate, substantially exclusively parallel to the excitation direction X, and a central mass referenced $12_g''$ and $12_d''$, respectively, that is housed in the frame and that slides, on the frame, substantially exclusively parallel to a detection direction, or "sense axis", perpendicular to the excitation direction X.

Each central mass can thus move, with respect to the substrate, in the detection direction and in the excitation direction. Because the frames oscillate in the excitation direction, the left and right inertial masses are also said to oscillate in the excitation direction.

The dual-mass gyrometer 5 can therefore be used to measure a speed of rotation about a so-called "rotation" axis parallel to a direction of rotation perpendicular to the excitation and detection directions.

In FIGS. 1 to 3, the detection direction is the direction Y, in the plane of the substrate 10, and the direction of rotation is the direction Z, perpendicular to the substrate 10.

In FIGS. 8 and 9, the detection direction is the direction Z, perpendicular to the plane of the substrate 10, and the direction of rotation is the direction Y, in the plane of the substrate 10. The left and right central masses $12_g''$ and $12_d''$ move toward the front and the back of the plane of the page.

The inertial mass also comprises a coupling spring 14, interposed between the left $12_g'$ and right $12_d'$ frames. The coupling spring 14 may itself be connected to the substrate.

The frames are mounted on the substrate 10 via guide springs 16.

The dual-mass gyrometer further comprises an electromechanical transducer member or "actuator" 17, for example a capacitive actuator, providing the left and right inertial masses with an oscillatory movement in the excitation direction X.

The actuator 17 is conventionally made up of two parts, the "left" part acting on the left inertial mass and the "right" part acting on the right inertial mass. Actuation is conventionally brought about by an electrostatic force, but may also be brought about by a piezoelectric or electrothermal force for example.

Conventionally, the actuator 17 also measures the amplitude of the movements of the inertial masses $12_g$ and $12_d$ in the excitation direction X.

The gyrometer thus comprises means for measuring the movements of the central masses in the detection direction. These means conventionally comprise a rocker 20 able to rotate on the substrate, about a rocker pivot 22. The left $20_g$ and right $20_d$ ends of the rocker 20 are respectively connected to the left and right central masses $12_g''$ and $12_d''$ respectively, so as to transmit to the arms of the rocker the movements of the central masses in the detection direction.

The axis of the rocker pivot 22 may in particular be parallel to the direction of rotation, as in the embodiment of FIGS. 1 to 3 or 8 and 9.

The stiffness of the coupling spring 14 and of the guide springs 16 is far lower in the excitation direction X than in the detection direction, which means that the oscillatory movement is substantially exclusively in the excitation direction X.

Means for measuring the movement of the central masses in the detection direction further comprise a mechanical-electrical transducing member or "detector" 24, configured to measure the rotation of the rocker 20 about the rocker pivot 22. The detector 24 may be a capacitive detector or a piezoresistive sensor, which is to say one of which the electrical capacitance or electrical resistance, respectively, varies according to the angular position of the rocker 20. The detector 24 may also be a piezoelectric sensor.

The gyrometer also comprises a control module 26 for controlling the actuator 17 and receiving and analyzing the signals emitted by the detector 24 and the signals emitted by the actuator 17 measuring the amplitude of the movements of the inertial masses $12_g$ and $12_d$ in the excitation direction X.

The control module 26 preferably comprises a phase-locked loop (PLL) circuit to control the actuator 17 according to the amplitude of the movements of the inertial masses $12_g$ and $12_d$ in the excitation direction X.

A phase-locked loop circuit, well known to those skilled in the art, conventionally comprises a phase comparator, an error corrector, for example of PID type, a tunable oscillator and, optionally, amplifiers, frequency filters, thresholding units to limit the excursion of the control, and signal conditioning components. The signal processing may be performed in part by digital units.

EP 2 600 104, EP 2 520 940 and EP 2 211 143 provide other details regarding the makeup of a dual-mass gyrometer.

In normal operation, and notably in the absence of external vibrations, the oscillatory movement of the frames of the left and right inertial masses parallel to the excitation direction is conventionally in a so-called "phase opposition" or "antiphase" mode in which the two frames move in opposition, always simultaneously moving toward or away from the coupling spring, as illustrated in FIG. 2, at a resonant frequency "in phase opposition". In other words, conventionally, the actuator 17 makes the inertial masses oscillate at a frequency substantially equal to the resonant frequency in phase opposition.

In this mode, the center of mass is theoretically stationary, and the gyrometer can be considered to be "balanced". It is therefore not very sensitive to vibrations around this frequency.

The resonant frequency in phase opposition is preferably greater than 10 kHz and less than 100 kHz, a frequency of around 20 kHz being preferred for an optimal compromise between sensitivity and energy consumption.

When the substrate is rotating about an axis parallel to the direction of rotation (Z in FIG. 1 or Y in FIG. 8), the oscillation of the inertial masses in the excitation direction gives rise to Coriolis forces that are proportional to the speed of rotation about the axis of rotation and to the masses and speeds of the inertial masses to which they apply.

The ratio of the mass of a central mass to the mass of the frame accommodating it is typically greater than 7, but may be less than 7 without that modifying the sensitivity of the gyrometer appreciably. By contrast, as regards the central masses, the stiffness in the detection direction is far lower than for the frames (there being at least a factor of 10 between them). The Coriolis force acts on the central masses and on the frames, but therefore produces in the detection direction a greater movement for the central masses.

The rotation of the substrate about the axis of rotation therefore substantially results exclusively in a movement of the central masses, parallel to the detection direction, in the frame of reference of the frames.

The directional sense of this action is dependent on the directional sense of movement of the central mass in the excitation direction. The movement of the frames parallel to the excitation direction X and in phase opposition therefore results in an oscillation of the central masses, parallel to the detection direction, one central mass "ascending" when the other "descends", as illustrated in FIG. 2.

The rocker arm may be connected directly or indirectly to the central masses. As a preference, an intermediate component or "uncoupling piston", not depicted, is interposed between each central mass and the arm of the rocker. This intermediate component is mounted with the ability to move on the substrate, exclusively translationally in the detection direction, and is mounted with the ability to move on the central mass, exclusively translationally in the excitation direction. The movement of the central mass in the detection direction is thus transferred in its entirety to this intermediate component, but the movement in the excitation direction X is not. This then reduces measurement bias.

The signal provided by the detector may advantageously be analyzed to evaluate the speed of rotation of the substrate about the axis of rotation.

The central masses and the left and right inertial masses may also oscillate parallel to the detection direction under the effect of external vibrations.

The left and right central inertial masses have a mode of oscillation along the detection axis, in which mode the movements of the two masses are opposed. The rocker that couples the two masses naturally blocks in-phase movement thereof (this mode is rejected at higher frequency>100 kHz and has a far lower amplitude). In the antiphase vibration mode, the center of mass of the masses is ideally stationary: the mode is said to be balanced and is therefore, by design, insensitive to external vibrations. However, manufacturing defects may generate sensitivity to external vibrations in this mode, but the low effects these have for 10 g vibrations allow the gyrometer to remain in a domain in which operation is linear. This residual sensitivity to vibrations occurs essentially around the resonant frequency of the mechanical detection mode which is generally positioned above the resonant frequency of the antiphase excitation mode. The process of demodulation of the Coriolis signal that occurs at the resonant frequency of the antiphase excitation mode nevertheless filters out this unwanted external vibration signal obtained by this process, which therefore causes little trouble to the operation of gyrometers in a vibratory environment.

A distinction is made between the "tuned mode" and the "untuned mode".

In the tuned mode, the resonant frequency of the oscillation of the inertial masses in the excitation direction X is substantially identical to the resonant frequency of the oscillation of the central masses in the detection direction. These resonant frequencies are dependent on the stiffnesses in the excitation and detection directions respectively, but are also dependent on the masses $m_X$ and $m_Y$ moved in these directions. $m_X > m_Y$ because the frames are moved in the excitation direction but not in the detection direction.

In the untuned mode, the resonant frequency in the excitation direction X is different than the resonant frequency in the detection direction. This is because it is desirable for the movements of the central masses, in the detection direction, in response to oscillation of the inertial masses in the excitation direction, to be as low as possible, which is to say for the mechanical response to be as flat as possible.

Electrostatic tuning means that allow the level of tuning to be modified, particularly in order to obtain the tuned mode, are known. The following article describes a gyrometer in a tuned mode: Zaman M F, Sharma A, Hao Z, Ayazi F. A Mode-Matched Silicon-Yaw Tuning-Fork Gyroscope With Subdegree-Per-Hour Allan Deviation Bias Instability. Journal of Microelectromechanical Systems. 2008 December; 17(6):1526-36.

The tuned mode gives greater sensitivity, but a narrower pass band than the untuned mode. In the untuned mode, the greater the difference between the resonant frequency in the excitation direction X and the resonant frequency in the detection direction, the flatter the frequency response will be.

For that, the resonant frequency of the mode along the detection axis is preferably higher than the resonant frequency of the mode along the excitation axis.

In practice, manufacturing defects may reduce the performance of the gyrometer, particularly when the gyrometer is subjected to a harsh vibratory environment. In particular, manufacturing defects (mass distribution, width, profile of the springs) may unbalance the gyrometer by altering the position of the center of mass of the inertial mass, making the phase opposition mode sensitive to the external vibrations around its resonant frequency.

This sensitivity to external vibrations has been studied in particular in the article by A. Koumela et al., "Resilience to Vibration of a Tuning Fork MEMS Gyroscope", *Procedia Engineering*, vol. 168, pp. 1725-1730, January 2016. This article, together with the articles "Tuning the Anti-Phase Mode Sensitivity to Vibrations of a MEMS Gyroscope" by Pierre Janioud et al., published in *Proceedings* 2017, 1, 355; of Eurosensors 2017—Paris (MDPI) describe various solutions for reducing this sensitivity.

The oscillatory movement of the left and right inertial masses parallel to the excitation direction X may also be done in a so-called "in phase" mode in which the frames oscillate at an "in phase" resonant frequency $f_{Dp}$, the separation between the two frames being constant.

The in phase mode does not allow the position of the center of mass P to be kept stationary: the gyrometer is therefore sensitive to external vibrations around the frequency $f_{Dp}$: this mode is unbalanced.

The amplitude of the movement of the inertial masses parallel to the excitation direction X may increase to the point that the movements produced by the actuator 17 and by the external vibrations become coupled or to the point that the travel of the inertial masses is limited by an end stop. The in phase mode may thus lead the inertial masses into a domain of nonlinear movement produced by the electrostatic forces of the actuator 17 or by the coming into abutment with the substrate. This then results in an error in the measurement.

In order to address all of the problems mentioned hereinabove, one solution is to configure the gyrometer in such a way that its resonant frequencies in phase and in phase opposition in the excitation direction are above a threshold frequency below which the structure is to be rendered insensitive to the external vibrations. Attempts are also made to configure the gyrometer such that the resonant frequency in phase $f_{Dp}$, in the excitation direction, is as high as possible, so that in service, it is reached as infrequently as possible in the event of external vibrations.

For example, the article "100 kHz MEMS Vibratory Gyroscope" by J.-T. Liewald et al., published in the *Journal of Microelectromechanical Systems*, vol. 22, no. 5, pp. 1115-1125, October 2013, proposes a structure operating at around 100 kHz. This structure has the effect of raising both resonant frequencies so that it is not possible to maintain a low resonant frequency for antiphase.

However, increasing the resonant frequencies may lead to a reduction in the sensitivity of the gyrometer when the operating frequency increases.

There is therefore a constant need for novel solutions for improving the reliability of a gyrometer in a harsh vibratory environment, particularly in an environment in which it is liable to be subjected to exterior vibrations at a frequency that may reach as high as 40 kHz, with accelerations which may reach 10 g, "g" denoting the standard acceleration due to gravity equal to 9.80665 m/s².

It is an objective of the present invention to, at least partially, address this need.

SUMMARY OF THE INVENTION

The invention proposes a gyrometer comprising:
1) a first dual-mass gyrometer comprising
a planar substrate,
first left and right inertial masses comprising:
  first left and right frames, respectively, aligned along a first excitation axis $X_1$ parallel to an excitation direction, and mounted with the ability to slide on the substrate along said first excitation axis $X_1$, and
  first left and right central masses, respectively, mounted with the ability to slide in the first left and right frames, respectively, parallel to a first detection direction perpendicular to the excitation direction;
a first oscillation-inducing actuator inducing oscillation, in the excitation direction, of the first left and right inertial masses and of the first coupling spring;
a first rocker mounted with the ability to rotate on the substrate about a first rocker pivot, first left and right ends of the first rocker being connected to the first left and right central masses, respectively; and
a first detector of the angular position of the first rocker about the first rocker pivot;
2) second left and right inertial masses aligned along a second axis $X_2$ parallel to said excitation direction, and mounted with the ability to slide on the substrate along the second axis $X_2$;
the gyrometer further comprising left and right arms, mounted with the ability to rotate on the substrate about a left arm pivot and a right arm pivot, respectively, having axes perpendicular to the substrate,
the left arm mechanically coupling the first left frame with the second left inertial mass, and the right arm mechanically coupling the first right frame with the second right inertial mass;
a first coupling spring being interposed between said first left and right frames and/or a second coupling spring being interposed between said second left and right inertial masses.

As will be seen in greater detail in the remainder of the description, the inventors have discovered that such coupling with the right and left arms advantageously makes it possible to increase the resonant frequency in phase in the excitation direction, reduce the sensitivity in the event of oscillation at this frequency, and maintain a resonant frequency in phase opposition in the direction of excitation in a "low frequency" range, typically around 20 kHz.

The coupling allows the resonant frequencies in phase and in antiphase to be pushed into a domain unaffected by the external mechanical vibrations. Typically, the resonance frequency in antiphase (useful) can be kept around 20 kHz, while the frequency in antiphase is pushed back beyond a threshold frequency typically of around 40-50 kHz.

The coupling allows the balance of the gyrometer to be substantially maintained, even in a harsh vibratory environment, for example at 40 kHz under 10 g.

Without being bound by this theory, the inventors explain this result by theorizing that the center of mass of the combination of inertial masses of the gyrometer maintains its immobility or reduces in amplitude of movement in all the mechanical modes, particularly in the one for which the left and right inertial masses oscillate in phase. This mode of oscillation is advantageously pushed out to a higher frequency, and has a lower amplitude response to the external vibrations.

Specifically, the gyrometer remains balanced because, when the first inertial masses oscillate in phase, in the excitation direction, the second inertial masses likewise oscillate in phase, in the excitation direction but in the opposite sense of that direction compared to the first inertial masses.

A gyrometer according to the invention preferably exhibits one or more of the following optional features:
the gyrometer comprises a said first coupling spring and a said second coupling spring;
a second coupling spring interposed between said second left and right inertial masses;
the first detection direction is parallel to the plane of the first excitation axis $X_1$ and of the second axis $X_2$, and to the plane of the substrate;

the first left inertial mass is mechanically coupled to the second left inertial mass exclusively by means of the left arm;

the first right inertial mass is mechanically coupled to the second right inertial mass exclusively by means of the right arm;

said first detector comprises a piezoresistive strain gage or a capacitive gage, preferably a piezoresistive strain gage;

said gage comprises at least one nanowire connecting the first rocker to the substrate, the distance between a point of mechanical connection of said nanowire to the first rocker and said first rocker pivot being preferably less than 100 microns, preferably of between 0.1 and 30 microns;

the gyrometer comprises a sensor of the angular position of at least one of the left and right arms, said sensor preferably being a piezoresistive strain gage or a capacitive gage, preferably a piezoresistive strain gage, and preferably comprising at least one nanowire connecting said arm to the substrate, preferably at least two nanowires connecting the left arm and right arm respectively to the substrate;

particularly in an embodiment suited to the untuned mode, the left and right arms are shaped in such a way that the resonant frequency at which the assembly of the first and second left inertial masses oscillates, in the excitation direction, in phase-opposition with the assembly of the first and second right inertial masses is different than any one of the resonant frequencies of the first central masses, in the first detection direction;

said difference preferably being greater than 1 kHz;

the left and right arms are shaped in such a way that the resonant frequency at which the assembly of the first and second left inertial masses oscillates, in the excitation direction, in phase-opposition with the assembly of the first and second right inertial masses is different than any one of the resonant frequencies of the first central masses in the first detection direction, and/or any one of the resonant frequencies of the second central masses, in the second detection direction, said difference preferably being greater than 1 kHz;

the position of the right arm pivot along the right arm is determined in such a way that the moments of the forces exerted by gravity, oriented in the excitation direction, on the right arm by the first and second right inertial masses about the right arm pivot compensate one another, which is to say that these moments of force are substantially identical when the right arm, horizontal, is resting on the right arm pivot;

the left and right arms are identical;

the left arm and/or the right arm has/have: a length greater than 100 microns, preferably greater than 200 microns, and/or less than 2000 microns, preferably less than 1500 microns, preferably of between 600 and 800 microns;

the left arm and/or the right arm has/have a width greater than 10 microns, preferably greater than 15 microns and/or less than 50 microns, preferably less than 40 microns;

the left arm and/or the right arm has/have an aspect ratio (length/width) greater than 5, preferably greater than 10, and/or less than 30, preferably less than 20;

the first and second last inertial masses are aligned along a left detection axis parallel to the first detection direction, the first and second right inertial masses are aligned along a detection axis parallel to the second detection direction, and said first and second excitation axes and said left and right detection axes extend in the one same plane perpendicular to the direction of rotation;

the gyrometer comprises a second dual-mass gyrometer comprising:

said substrate, said second left and right inertial masses, said second left and right inertial masses comprising:

second left and right frames, respectively, aligned along the second axis known as "second excitation axis" $X_2$, and mounted with the ability to slide on the substrate along the second excitation axis $X_2$, and second left and right central masses, respectively, mounted with the ability to slide in the second left and right frames, respectively, parallel to a second detection direction, identical to or different than the first detection direction;

said second coupling spring, interposed between said second left and right frames;

a second oscillation-inducing actuator inducing oscillation, in the excitation direction X, of the second left and right inertial masses and of the second coupling spring, the second actuator being identical to or different than the first actuator;

a second rocker mounted with the ability to rotate on the substrate about a second rocker pivot, second left and right ends of the second rocker being connected to the second left and right central masses respectively; and a second detector of the angular position of the second rocker about the second rocker pivot;

the second dual-mass gyrometer is identical to the first dual-mass gyrometer;

the left arm is mounted with the ability to rotate on the first and second left frames, about first and second left axes of rotation which are perpendicular to the excitation direction, respectively;

the right arm is mounted with the ability to rotate on the first and second right frames, about first and second right axes of rotation which are perpendicular to the excitation direction, respectively;

the gyrometer comprises a control module comprising a phase-locked loop circuit configured to control the first and second actuators;

the first and second detection directions are identical, the first detector is configured to provide a first measurement of a rotation of the first rocker about the first rocker pivot, the second detector is configured to provide a second measurement of a rotation of the second rocker about the second rocker pivot, the gyrometer comprising a module configured to provide a signal on the basis of the first and second measurements;

each of the first and second detectors comprises a strain gage, preferably piezoresistive;

in one embodiment, each of the second left and right inertial masses is a monobloc mass;

the gyrometer comprises several assemblies each comprising said second left and right inertial masses respectively, aligned along a respective so-called second axis, parallel to said excitation direction, and mounted with the ability to slide on the substrate along said respective second axis; and for each said assembly, respective left and right arms, mounted with the ability to rotate on the substrate about left arm and right arm pivots respectively, having axes perpendicular to the substrate, the left arm mechanically coupling the first left frame to the respective second left inertial mass, and the right arm mechanically coupling the first right frame to the respective second right inertial mass;

for each said assembly, each of the second left and right inertial masses is a monobloc mass.

The invention finally relates to the use of a gyrometer according to the invention in an environment in which it is liable to be subjected to external vibrations up to a frequency of 40 kHz at 10 g, particularly in an automobile, a machine tool or in an inertial station in a vibratory environment.

The invention relates in particular to the use of a gyrometer according to the invention in an environment in which it is liable to be subjected to external vibrations in the range 15-40 kHz from 0.01 g, or even from 0.001 g up.

Definitions

An axis (or a direction) is considered to be perpendicular to another axis (or direction) when planes perpendicular to these axes (or directions) are perpendicular to one another.

A nanowire is a wire the equivalent diameter of which is less than 1 micron.

The "frequency of operation" is the frequency at which the inertial masses are set in motion by the actuator to render the gyrometer operational. This frequency is equal to or close to the resonant frequency of the mechanical mode in antiphase along the excitation axis. In the absence of external vibrations, this frequency is the frequency imposed by the actuator. The excitation signal imposed by the actuator may be modified in the conventional way to adapt the operation of the gyrometer to suit a particular environment. The movement can be modified under the effect of external vibrations and corrected by a phase-locked loop in order to regulate the oscillations to a given level of amplitude and a given level of frequency.

A "mechanical mode" is characterized by a distribution of the deformation of a structure, weighted by a one same amplitude of oscillation, this set then describing its movement. This deformation distribution is invariable when the mechanical structure moves freely following a stressing of the system in this mechanical mode alone. It is also characterized by a resonant frequency at which the amplitude of oscillation for a given excitation force is at its maximum.

The "excitation mode in antiphase" corresponds to a mechanical mode in which the inertial masses move in phase opposition along the excitation axis.

The "excitation mode in phase" corresponds to a mechanical mode in which the inertial masses move along the excitation axis in phase.

"Comprise", "have" and "exhibit" are to be interpreted broadly and nonlimitingly unless indicated otherwise.

The adjectives "first", "second", "left", or "right" are used for the sake of clarity.

BRIEF DESCRIPTION OF THE DRAWINGS

Further features and advantages of the invention will become more apparent from reading the detailed description which follows and from studying the attached drawing, given solely for illustrative purposes, in which:

FIG. 1 schematically depicts, in a view from above, a dual-mass gyrometer;

FIG. 2 illustrates the normal operation of the gyrometer of FIG. 1 when the substrate is rotating about an axis of rotation oriented in the direction Z;

FIG. 3 illustrates unbalanced operation of the gyrometer of FIG. 1 when it is rotating about an axis of rotation oriented in the direction Z;

FIGS. 4 to 7 schematically depict, in a view from above, a gyrometer according to the invention actuated according to the 4 main mechanical excitation modes;

FIGS. 8 and 9 schematically depict, viewed from above and face-on, a variant of a dual-mass gyrometer, FIG. 9 only partially depicting the gyrometer of FIG. 8;

FIG. 10 schematically depicts, in a view from above, a "two-axis" gyrometer according to the invention;

FIG. 11 illustrates the positioning of the arm pivots

FIG. 12 schematically depicts, in a view from above, a gyrometer according to the invention in an embodiment in which the second inertial masses are monobloc masses;

FIG. 13 schematically depicts, in a view from above, a gyrometer according to the invention in an embodiment in which the gyrometer comprises several sets of monobloc left and right inertial masses;

FIG. 14 schematically depicts, in a view from above, a gyrometer according to the invention in an embodiment in which the second inertial masses are monobloc masses coupled by a coupling spring;

FIG. 15 schematically depicts, in a view from above, a gyrometer according to the invention in an embodiment in which the gyrometer comprises several sets of monobloc left and right inertial masses coupled by a respective coupling spring.

For the sake of clarity, the first and second dual-mass gyrometers of a gyrometer according to the invention have been depicted only partially.

In the various figures, identical references are used to denote components that are identical or analogous.

DETAILED DESCRIPTION

As FIGS. 1 to 3 were described in the preamble, reference is made now to FIG. 4.

A gyrometer according to the invention comprises first and second dual-mass gyrometers $5_1$ and $5_2$ respectively, which are either identical or different. First and second dual-mass gyrometers that are different are advantageous for achieving a "two-axis" gyrometer.

Single-Axis Gyrometer

A single-axis gyrometer is able only to measure speeds of rotation about axes of rotation that are parallel to a predefined direction.

FIGS. 1 to 7 relate to a single-axis gyrometer which is able to measure speeds of rotation only about axes of rotation that are parallel to the direction Z.

The dual-mass gyrometers $5_1$ and $5_2$ are similar to the one described in the preamble. Unless indicated otherwise, the dual-mass gyrometer description of the preamble therefore applies to each of the first and second dual-mass gyrometers of a gyrometer according to the invention.

For the sake of clarity, the same references are used for each of the dual-mass gyrometers, the references of the first and second dual mass gyrometers being assigned a suffix "1" or "2" respectively, however. The components are also designated in the same way, the designations of components of the first and second dual-mass gyrometers however being qualified as "first" or "second", respectively.

As depicted in FIG. 4, the first and second dual-mass gyrometers $5_1$ and $5_2$ are placed on a planar common substrate 10, side by side, along first and second excitation axes $X_1$ and $X_2$ which are parallel. The first and second dual-mass gyrometers $5_1$ and $5_2$ are arranged top to tail, the first left and right frames facing the second left and right frames, respectively. In other words, the first and second rockers $20_1$ and $20_2$ face toward the outside of the gyrometer.

Alternatively, the first and second dual-mass gyrometers $5_1$ and $5_2$ may be oriented toward one another, the first and second rockers $20_1$ and $20_2$ facing one another and the second left and right frames opening onto the inside of the gyrometer.

According to the invention, the gyrometer comprises left $30g$ and right $30d$ arms, the left arm mechanically coupling the first left inertial mass $12_{g1}$ to the second left inertial mass $12_{g2}$, and the right arm mechanically coupling the first right inertial mass $12_{d1}$ to the second right inertial mass $12_{d2}$.

The left and right arms are preferably identical. They are preferably coupled in the same way to the inertial masses they connect. Only the left arm and its arrangement are therefore described hereinafter, this description also applying to the right arm.

The left arm comprises first and second ends which are mounted with the ability to rotate on the first and second left frames $12_{g1}'$ and $12_{g2}'$ respectively, about prong pivots $33_{g1}$ and $33_{g2}$, respectively, parallel to the direction Z. A mounting with the ability to rotate may be obtained, for example, by a local reduction in the amount of material or by a local modification to the nature of the material of the prong.

As a preference, the left arm comprises a left rod $32g$ and two left prongs $34_{g1}$ and $34_{g2}$ which are connected to the first and second left frames $12_{g1}'$ and $12_{g2}'$ respectively.

The two left prongs project from the left rod, in the manner of a fork. The left arm thus has the overall shape of a very flattened U.

The prong pivots $33_{g1}$ and $33_{g2}$ are preferably the result of a localized reduction of the material of the left prongs $34_{g1}$ and $34_{g2}$, in the excitation direction X. Advantageously, such a local reduction in material also gives a transverse stiffness, in the detection direction Y, that is lower than the stiffness in the excitation direction X.

The left rod $32g$ is mounted with the ability to rotate about a left arm pivot $35g$ rigidly secured to the substrate 10 and oriented perpendicular to the substrate. As a preference, the left arm pivot $35g$ allows only rotation about an axis perpendicular to the plane of the substrate.

The torsional stiffness about the left arm pivot is low.

The contribution of mechanical stiffness for the inertial masses along the excitation axis needs to be negligible in comparison with the stiffness of the guide springs 16.

This pivot connection to the substrate gives the left rod $32g$ a single degree of freedom, in rotation about the axis of said left arm pivot $35g$. The movements of the first and second left frames in the excitation direction are therefore opposed. The in-phase movement of these two masses is practically blocked. However, it may be observed for a very low amplitude and a vibration mode pushed back to higher frequencies (>40-50 kHz) than the operating frequency.

The position of the left arm pivot $35g$ along the left rod $32g$ is determined in such a way that the moments of force exerted by gravity (directed along the excitation axis) on the left arm by the first and second left inertial masses about the left arm pivot $35g$ compensate for one another.

FIG. 11 illustrates how the moments of force are evaluated. In the embodiment illustrated, the mass $m_2$ of the second left inertial mass $12_{g2}$ is greater than the mass $m_1$ of the first left inertial mass $12_{g1}$. V is the vertical direction and is directed upward. The moments of force that are exerted by the masses $m_1$ and $m_2$ are therefore $m_1 \cdot d_1$ and $m_2 \cdot d_2$ and the position of the left arm pivot $35g$ is determined so that these moments are of the same amplitude and oppose one another.

If $m_1$ and $m_2$ are equal, then the left arm pivot $35g$ is therefore midway along the length of the left arm.

The position of the left arm pivot $35_g$ along the left arm is thus preferably determined so that the moments of force exerted by gravity on the left arm by the first and second left inertial masses about the left arm pivot $35_g$ are substantially identical when the left arm, horizontal, is resting on the left arm pivot $35_g$, and the position of the right arm pivot $35_d$ along the right arm is preferably determined so that the moments of force that are exerted by gravity on the right arm by the first and second right inertial masses about the right arm pivot $35_d$ are substantially identical when the right arm, horizontal, rests on the right arm pivot $35_d$.

Said local reductions in the left prongs $34_{g1}$ and $34_{g2}$ make it easier for the left rod $32g$ to effect a rotational movement about the left arm pivot $35g$.

The left prongs $34_{g1}$ and $34_{g2}$ have high stiffness in the excitation direction X, compared with the equivalent stiffnesses, in this direction, of the guide springs and of the left arm pivot $35g$. This stiffness of the left prongs $34_{g1}$ and $34_{g2}$ opposes movements of the left inertial masses in that direction.

The left prongs $34_{g1}$ and $34_{g2}$ have a torsional stiffness, about an axis parallel to the direction Z, that is less than or equal to that of the left arm pivot $35g$.

As depicted in FIGS. 4 to 7, the rod is preferably substantially nondeformable in service.

The stiffness conferred by the left arm advantageously means that forces resulting from external vibrations and that are exerted on the first and second left inertial masses $12_{g1}$ and $12_{g2}$ can be opposed.

The left arm is preferably made of a material chosen from silicon Si, SiN, SiC, quartz, and more generally any material used for creating MEMS structures.

The left arm preferably has a length $L_{30}$ greater than 100 microns, preferably greater than 200 microns, preferably greater than 300 microns, preferably greater than 400 microns, and/or less than 2000 microns, preferably less than 800 microns.

The left arm preferably has a width $l_{30}$ greater than 5 microns, preferably greater than 10 microns, preferably greater than 15 microns, and/or less than 50 microns, preferably less than 40 microns.

The aspect ratio of the cross section of the rod of the left arm, namely the ratio length $L_{30}$/width $l_{30}$ is preferably less than 30.

The thickness of the left arm, measured in the direction Z, when identical to that of the inertial masses, has little effect on how the left arm behaves. As a preference, the thickness of the arm is greater than 5 μm, the maximum thickness of the arm in practice being determined by the thickness of the substrate.

The cross section of the rod, namely the cross section in a plane perpendicular to its length, can be any, for example rectangular or oval.

The shape of the left arm is nonlimiting.

The way in which the gyrometer behaves depends on the stiffness generated by the presence of the right and left arm pivots, of the left and right arms and of the mass thereof. A person skilled in the art however knows how to modify this stiffness, particularly by modifying the material of which the arms are made, or by modifying their dimensions, for example by modifying the width of the rods of the arms, and the shape of their cross sections. In practice, the stiffness can be modified by adjusting the characteristics of the prong and arm pivots.

The mass of the left and right arms increases the inertia of the mechanical excitation mode: that may lead to a small drop in its resonant frequency. This phenomenon may be minimized if need be by altering the shape and material in order to obtain suitable stiffness characteristics for the structure.

Simple tests can be used to check how the gyrometer behaves with a given shape of arm. These tests, which may for example be simulated using the finite element method, make it possible to identify unbalanced vibration modes and evaluate the resonant frequencies thereof.

The lowest resonant frequency of the unbalanced mechanical modes determines the upper frequency band limit or "pass band" limit within which the gyrometer is substantially insensitive to external vibrations, within the limit of a given amplitude (for example 10 g) of vibrations.

Such tests have demonstrated that the preferred characteristics hereinabove advantageously allow balanced mechanical modes to be offered out to very high external vibrational frequencies.

As a preference, the arms are shaped to maintain to this balance out to external vibrational frequencies greater than 30 kHz and preferably greater than 40 kHz.

The stiffness of the arms influences the resonant frequencies in the excitation direction X.

The mechanical coupling provided by the arms means that two adjacent masses considered from among the first inertial masses and second inertial masses oscillate in pairwise phase opposition in the excitation direction X at the one same resonant frequency $f_{Da}$ that are substantially equal to the resonant frequencies $f_{Da1}$ and $f_{Da2}$, which for first and second gyrometers that are identical are themselves likewise equal. The resonant frequencies of the unbalanced modes are advantageously pushed out beyond 45 kHz in simulations. In the event that the first and second gyrometers are not identical, a resonant frequency in antiphase along the excitation axis appears in an intermediate frequency range ($f_{Da1}$ and $f_{Da2}$).

The left and right arms have substantially nil effect on the vibration mode of the central masses in the detection direction.

For the untuned mode, the arms are preferably shaped in such a way that the difference between the resonant frequency $f_{Da}$ in the excitation direction X, in the mode of oscillation in phase opposition, and
  any one of the resonant frequencies of the first central masses, in the detection direction, and/or
  any one of the resonant frequencies of the second central masses, in the detection direction,
  is greater than 1 kHz.

Advantageously the width of the pass band is thereby increased.

This feature of the gyrometer according to the invention distinguishes it in particular from gyroscopes, for which what is conventionally sought is a minimal difference, preferably a zero difference, between the resonant frequencies in the excitation direction and in the detection direction.

As a further preference, the arms are shaped in such a way that the resonant frequency $f_{Da}$ in the excitation direction X, in the mode of oscillation in phase opposition, is less than any one of the resonant frequencies in the detection direction. This embodiment is particularly advantageous for the untuned mode.

As a preference, the left arm is the only means of coupling between the first left inertial mass and the second left inertial mass. In particular, there is no coupling spring interposed between the first and second left frames.

Advantageously, coupling using the left arm alone is relatively simple to achieve.

Furthermore, this makes the first and second dual-mass gyrometers simpler to control.

Moreover, the movements of the inertial masses of the first and second dual-mass gyrometers, driven by at least one actuator 17, for example by the first and second actuators $17_1$ and $17_2$ depicted symbolically (and only in FIG. 4 for the sake of clarity) are coupled by virtue of the arms and of the coupling springs. A single actuator can therefore be used to activate a desired vibration mode.

As a preference, the first and second actuators $17_1$ and $17_2$ each comprise a sensor for measuring the amplitude of the movements, in the excitation direction X, of the first left and right inertial masses and of the second left and right inertial masses respectively, preferably a piezoresistive or capacitive measurement sensor, preferably piezoresistive.

For a single-axis gyrometer, the measurements that the first and second detectors $24_1$ and $24_2$ provide may advantageously be compared against one another, preferably by a control module 26 common to the two dual-mass gyrometers, particularly in order to check that they are coherent with one another. In particular, if the difference between these measurements exceeds a predetermined threshold, the control module 26 may consider that at least one of the measures is erroneous and preferably issue an alarm accordingly.

Finally, for a single-axis gyrometer, the acquisition of two measurements may be used to increase the sensitivity of the gyrometer.

As a preference, the first and second detectors $24_1$ and $24_2$ comprise first and second sensors of the angular position of the first and second rocker respectively. These sensors are preferably first and second piezoresistive strain gages. These gages are set out in such a way as to deform under the effect of the movement of the first and second rockers $20_1$ and $20_2$ respectively.

Such gages prove to be particularly reliable. In particular, inexplicably, the inventors have found that they provide more reliable measurements than capacitive gages in the presence of external vibrations.

Other transducer components, for example capacitive gages, are, however, likewise conceivable.

One gage is preferably fixed to at least one of the first and second rockers $20_1$ and $20_2$, as a preference, in order to increase the symmetry of the gyrometer and therefore its balance, on each of the first and second rockers $20_1$ and $20_2$. The measurements provided by the gages and by the actuator 17 for measuring the amplitude of the movements of the inertial masses $12_g$ and $12_d$ in the excitation direction X are preferably processed by the one same control module 26.

Gages made completely or partially from metal, preferably aluminum or platinum, may also be used. As a preference, the gages are made of p-doped or n-doped silicon as that material gives a particularly high piezoresistive effect (a gage factor of 50 for a doping of a few $10^{19}$ cm$^{-3}$, as compared with a gage factor of a few units for metals). Other doped semiconductors such as germanium may be envisioned.

As a preference, these gages comprise piezoresistive nanowires connecting the first and second rockers $20_1$ and $20_2$ to respective anchor points which are fixed with respect to the substrate 10. A rocking movement of one rocker thus modifies the length of the nanowires and therefore the resistance of the nanowires. Measuring this resistance thus allows the angular position of the rocker about its rocker pivot to be evaluated.

As a preference, a detector of one rocker, preferably of any one rocker, comprises two said nanowires positioned each on a respective side of the rocker pivot of said rocker so that a rocker movement that applies a tensile force to one of said nanowires at the same time applies a compressive action to the other of said nanowires.

As a preference, the distance between the rocker pivot and any one of said nanowires is less than 100 μm, less than 60 μm, or less than 40 μm, and/or greater than 1 μm, greater than 10 μm, greater than 20 μm or greater than 30 μm. It is preferably used to adjust the resonant frequency in the detection direction. The effect that the nanowires have on the stiffness in this direction is effectively predominant. A low force applied, at the ends of the rocker, by the central masses may thus result in a high tensile or compressive force on the nanowires, as a result of the lever arm effect.

The gages may also for example be capacitive gages.

In one embodiment, the gyrometer comprises a sensor of the angular position of at least one of the left and right arms. Said sensor is preferably a piezoresistive strain gage or a capacitive gage, preferably a piezoresistive strain gage. The strain gages described hereinabove may be used.

The sensor preferably comprises at least one nanowire (not depicted in figures), connecting said arm to the substrate, preferably at least left and right nanowires connecting the left arm and the right arm to the substrate respectively.

The sensor of the angular position of at least one of the left and right arms may advantageously replace the measurement sensors conventionally used for measuring the amplitude of the movements, in the excitation direction X, of the first left and right inertial masses and of the second left and right inertial masses respectively. In particular, in this embodiment, control of the movement in the excitation direction and measurement of the movement in the detection direction may be controlled by one same electronic control unit, for example by time division multiplexing of the two channels.

Example

Finite element simulations were conducted.

The gyrometer was subjected to external vibrations, at increasing frequencies. The way in which the gyrometer behaved was observed. This is illustrated for certain notable frequencies in FIGS. 4 to 7.

FIG. 6 illustrates a first possible mode of operation referred to as "working balanced drive" in which
the first and second dual mass gyrometers $5_1$ and $5_2$ are each in the phase opposition mode in the direction of excitation and in the detection direction,
the first and second left inertial masses are in phase opposition in the excitation direction and in the detection direction, and
the first and second right inertial masses are in phase opposition in the excitation direction and in the detection direction.
The first left inertial mass is in phase with the second right inertial mass. The second left inertial mass is in phase with the first right inertial mass. The assembly made up of the first left inertial mass and of the second right inertial mass is in phase opposition with the assembly made up of the second left inertial mass and of the first right inertial mass.

The mechanical mode is balanced and is therefore ideally insensitive to external vibrations, the frequency of the oscillations being 20.5 kHz. The "working balanced drive" mode is the preferred mode of operation. It corresponds to the "normal" mode of operation, in the absence of external vibrations.

FIG. 5 illustrates a second embodiment referred to as "second balanced drive", in which
the first and second dual mass gyrometers $5_1$ and $5_2$ are each in the mode in phase in the direction of excitation and in the detection direction,
the first and second left inertial masses are in phase opposition in the detection direction and in the excitation direction,
the first and second right inertial masses are in phase opposition in the detection direction and in the excitation direction.

The mechanical mode is balanced, the frequency of oscillations being 22.8 kHz. It is ideally insensitive to external vibrations.

FIG. 4 illustrates a third possible mode of operation referred to as "first balanced drive", in which
the first and second dual mass gyrometers $5_1$ and $5_2$ are each in the phase opposition mode in the detection direction and in the excitation direction,
the first and second left inertial masses are in phase in the detection direction and in the excitation direction, and
the first and second right inertial masses are in phase in the detection direction and in the excitation direction.

The mechanical mode is balanced, the frequency of the oscillations being 46.3 kHz. It is ideally insensitive to external vibrations.

FIG. 7 illustrates a fourth mode of operation referred to as "sensitive drive", in which
the first and second dual mass gyrometers $5_1$ and $5_2$ are each in the mode in phase in the detection direction and in the excitation direction,
the first and second left inertial masses are in phase opposition in the detection direction and in phase in the excitation direction, and
the first and second right inertial masses are in phase opposition in the detection direction and in phase in the excitation direction.

The mechanical mode is unbalanced. The mode of oscillation in phase of the first and second dual mass gyrometers $5_1$ and $5_2$ in the excitation direction can thus be activated by external vibrations. In the absence of arms, the amplitude of the oscillations would be several orders of magnitude higher and the resonant frequency would be close to 20 kHz in the band of vibration frequencies that it is desired to exclude. According to the invention, the left and right arms provide the ability to oppose the efforts produced by the inertial forces resulting from the external vibrations and exerted on the frames of the first left and right inertial masses, and to the corresponding efforts exerted on the frames of the second left and right inertial masses, respectively. The arms advantageously provide the ability to oppose activation of this mode of operation under the effect of external vibrations.

Remarkably, this imbalance appears only at a frequency of oscillation of around 47.6 kHz because of the presence of the left and right arms which provide a significant additional amount of mechanical stiffness along the excitation axis, and which oppose movement in the mode. However, modifications to the mechanical characteristics of the arms, particularly the strength or width of the arms or the stiffness of the arm pivots allows this frequency of imbalance to be pushed back further still.

These performance aspects demonstrate that a gyrometer according to the invention is well suited to a harsh vibratory environment such as that of a motor vehicle engine or that of a machine tool. The large tolerance to vibration advantageously allows greater flexibility in the siting of the gyrometer in its position of use.

Two-Axis Gyrometer

The invention is not restricted to a single-axis gyrometer and also extends to a two-axis gyrometer able to measure rotation rates about axes of rotation parallel to two pre-defined directions.

FIG. 10 illustrates a two-axis gyrometer according to the invention, able to measure rotation rates about axes of rotation parallel to the direction Y and/or to the direction Z.

The gyrometer according to this embodiment is similar to the single-axis gyrometer according to the invention described hereinabove, but comprises a first dual mass gyrometer $5_1$ of the type of that of FIGS. 8 and 9, and a second dual mass gyrometer $5_2$ of the type of that of FIGS. 1 to 3.

In particular, like the single-axis gyrometer according to the invention, it comprises left $30_g$ and right $30_d$ arms mounted to rotate on the substrate about a left-arm pivot $35_g$ and a right-arm pivot $35_d$, respectively, the left arm mechanically coupling the frames of the first left inertial mass $12_{g1}$ and of the second left inertial mass $12_{g2}$, and the right arm $30_d$ mechanically coupling the frames of the first right inertial mass $12_{d1}$ and of the second right inertial mass $12_{d2}$.

Gyrometer with Monobloc Second Left and Right Inertial Masses

In the preferred embodiment described above, the left arm mechanically couples first and second left frames and the right arm mechanically couples first and second right frames, the second left and right frames belonging to a second dual-mass gyrometer.

In a variant illustrated in FIG. 12, the second left and right inertial masses do not belong to a dual-mass gyrometer but are monobloc left and right masses mounted with the ability to slide along a second axis $X_2$ (corresponding to the "second excitation axis" of the embodiment in which the second left and right inertial masses belong to a second dual mass gyrometer). As a preference, the second left and right inertial masses are guided by guide springs so that they can move only in sliding along the second axis.

The monobloc second masses and the positions of the arm pivots are preferably determined in such a way as to form, with the first inertial masses, for each arm, "balanced assemblies" namely assemblies in which the moments of force exerted by gravity, oriented in the excitation direction, on the right arm by the first and second right inertial masses about the right arm pivot compensate for one another, and in which the moments of force exerted by gravity, oriented in the excitation direction, on the left arm by the first and second left inertial masses about the left arm pivot compensate for one another.

Advantageously, monobloc second left and right inertial masses are able to balance the loads produced by the vibrations on the frame of the first left and right inertial masses. That means that the mechanical structure can be given greater symmetry.

As illustrated in FIG. 13, a gyrometer according to the invention may comprise several monobloc left and right masses assemblies. In each assembly, the monobloc left and right masses are mechanically coupled to the first left and right frames respectively by left and right arms respectively.

As a preference, the gyrometer comprises exactly two said assemblies, preferably arranged symmetrically with respect to the first excitation axis $X_1$, as in FIG. 13. Advantageously, the dimensions of the monobloc left and right masses and of the left and right arms can be reduced.

As illustrated in FIGS. 14 and 15, the monobloc second left and right inertial masses of one assembly may be coupled by a second coupling spring $14_2$. Advantageously, the second coupling spring allows the resonant frequency of the drive mode of the entire gyrometer structure to be pushed out to a level comparable with that of the structure without the second left and right inertial masses. This coupling spring offers an additional degree of freedom for the left and right coupling.

As is now clearly apparent, a gyrometer according to the invention offers remarkable resistance to vibrations. Furthermore, it is compact, reliable, notably thanks to the use of piezoresistive sensors, and offers improved sensitivity.

A single axis gyrometer according to the invention in particular allows double measurement of a rotation rate.

Of course, the invention is not restricted to the embodiments described and depicted, which have been provided merely for illustrative purposes.

In particular, other known techniques for limiting the effects of external vibrations can be implemented, to supplement the invention.

The first and second dual mass gyrometers of a single-axis gyrometer according to the invention may be of the type of FIGS. 8 and 9.

At least one coupling spring needs to be provided between the first left and right inertial masses or between the second left and right inertial masses. The simultaneous presence of a first coupling spring between the first left and right inertial masses and of a second coupling spring between the second left and right inertial masses is optional.

The invention claimed is:

1. A gyrometer comprising:
   1) a first dual-mass gyrometer comprising
   a planar substrate extending in a plane,
   first left and right inertial masses comprising:
   first left and right frames, respectively, aligned along a first excitation axis $X_1$ parallel to an excitation direction, and mounted with the ability to slide on the substrate along said first excitation axis $X_1$, and
   first left and right central masses, respectively, mounted with the ability to slide in the first left and right frames, respectively, parallel to a first detection direction perpendicular to the excitation direction;
   a first oscillation-inducing actuator inducing oscillation, in the excitation direction, of the first left and right inertial masses and of a first coupling spring;
   a first rocker mounted with the ability to rotate on the substrate about a first rocker pivot, first left and right ends of the first rocker being connected to the first left and right central masses, respectively; and
   a first detector of the angular position of the first rocker about the first rocker pivot;
   2) second left and right inertial masses aligned along a second axis $X_2$ parallel to said excitation direction, and mounted with the ability to slide on the substrate along the second axis;
   the gyrometer further comprising left and right arms, mounted with the ability to rotate on the substrate about a left arm pivot and a right arm pivot, respectively, having axes perpendicular to the substrate, the left arm mechanically coupling the first left frame with the second left inertial mass, and the right arm mechanically coupling the first right frame with the second right inertial mass;

the first coupling spring being interposed between said first left and right frames and/or a second coupling spring being interposed between said second left and right inertial masses.

2. The gyrometer according to claim 1, comprising the said second coupling spring.

3. The gyrometer according to claim 2, comprising a second dual-mass gyrometer comprising:

said second left and right inertial masses, said second left and right inertial masses comprising:

second left and right frames, respectively, aligned along the second axis known as "second excitation axis" $X_2$, and mounted with the ability to slide on the substrate along the second excitation axis $X_2$, and second left and right central masses, respectively, mounted with the ability to slide in the second left and right frames, respectively, parallel to a second detection direction, identical to or different than the first detection direction;

said second coupling spring, interposed between said second left and right frames;

a second oscillation-inducing actuator inducing oscillation, in the excitation direction, of the second left and right inertial masses and of the second coupling spring, the second actuator being identical to or different than the first actuator;

a second rocker mounted with the ability to rotate on the substrate about a second rocker pivot, second left and right ends of the second rocker being connected to the second left and right central masses respectively; and a second detector of the angular position of the second rocker about the second rocker pivot.

4. The gyrometer according to claim 3, wherein the second left and right inertial masses, the second coupling spring, the second oscillation-inducing actuator, the second rocker, and the second detector of the angular position are respectively identical to the first left and right inertial masses, the first coupling spring, the first oscillation-inducing actuator, the first rocker, and the first detector of the angular position; and/or the left and right arms are identical.

5. The gyrometer according to claim 3, wherein the left arm is mounted with the ability to rotate on the first and second left frames, about first and second left axes of rotation which are perpendicular to the excitation direction, respectively, and/or the right arm is mounted with the ability to rotate on the first and second right frames, about first and second right axes of rotation which are perpendicular to the excitation direction, respectively.

6. The gyrometer according to claim 3, comprising a control module comprising a phase-locked loop circuit configured to control the first and second actuators.

7. The gyrometer according to claim 3, wherein the first and second detection directions are identical, the first detector is configured to provide a first measurement of a rotation of the first rocker about the first rocker pivot, the second detector is configured to provide a second measurement of a rotation of the second rocker about the second rocker pivot, the gyrometer comprising a module configured to provide a signal on the basis of the first and second measurements.

8. The gyrometer according to claim 1, wherein the first detection direction is parallel to the plane of the first excitation axis and of the second axis, and to the plane in which the substrate extends.

9. The gyrometer according to claim 1, wherein the first left inertial mass is mechanically coupled to the second left inertial mass exclusively with the left arm, and the first right inertial mass is mechanically coupled to the second right inertial mass exclusively with the right arm.

10. The gyrometer according to claim 1, wherein said first detector comprises a piezoresistive strain gage or a capacitive gauge.

11. The gyrometer according to claim 10, wherein said gauge comprises at least one nanowire connecting the first rocker and to the substrate, the distance between a point of mechanical connection of said nanowire to the first rocker and said first rocker pivot being less than 100 microns, or connecting at least one of the left and right arms to the substrate.

12. The gyrometer according to claim 1, wherein the left and right arms are shaped in such a way that the resonant frequency at which the assembly of the first and second left inertial masses oscillates, in the excitation direction, in phase-opposition with the assembly of the first and second right inertial masses is different than any one of the resonant frequencies of the first central masses, in the first detection direction.

13. The gyrometer according to claim 12, wherein said difference is greater than 1 kHz.

14. The gyrometer according to claim 13, wherein the position of the left arm pivot along the left arm is configured in such a way that the moments of force exerted by gravity, oriented in the excitation direction, on the left arm by the first and second left inertial masses about the left arm pivot compensate one another.

15. The gyrometer according to claim 1, wherein the left arm and/or the right arm has/have:

a length greater than 100 microns and less than 2000 microns; and/or a width greater than 10 microns and less than 50 microns, and/or an aspect ratio equal to the ratio length/width greater than 5 and less than 30.

16. The gyrometer according to claim 1, wherein each of the second left and right inertial masses is a monobloc mass.

17. The gyrometer according to claim 1, comprising a plurality of assemblies each comprising one respective set of said second left and right inertial masses, aligned along a respective so-called second axis, parallel to said excitation direction, and mounted with the ability to slide on the substrate along said respective second axis; and for each said assembly, respective left and right arms, mounted with the ability to rotate on the substrate about left arm and right arm pivots respectively, having axes perpendicular to the substrate, for each said assembly, the left arm mechanically coupling the first left frame to the respective second left inertial mass, and the right arm mechanically coupling the first right frame to the respective second right inertial mass.

18. The gyrometer according to claim 17, wherein, for each said assembly, each of the second left and right inertial masses is a monobloc mass.

19. A method of using a gyrometer according to claim 1, said method comprising subjecting said gyrometer to external vibrations at a frequency of 40 kHz under 10 g.

* * * * *